Aug. 24, 1948.　　　P. W. PRATT　　　2,448,003
IGNITION CONTROL
Filed Oct. 27, 1945　　　　　　　　　　　　2 Sheets-Sheet 1
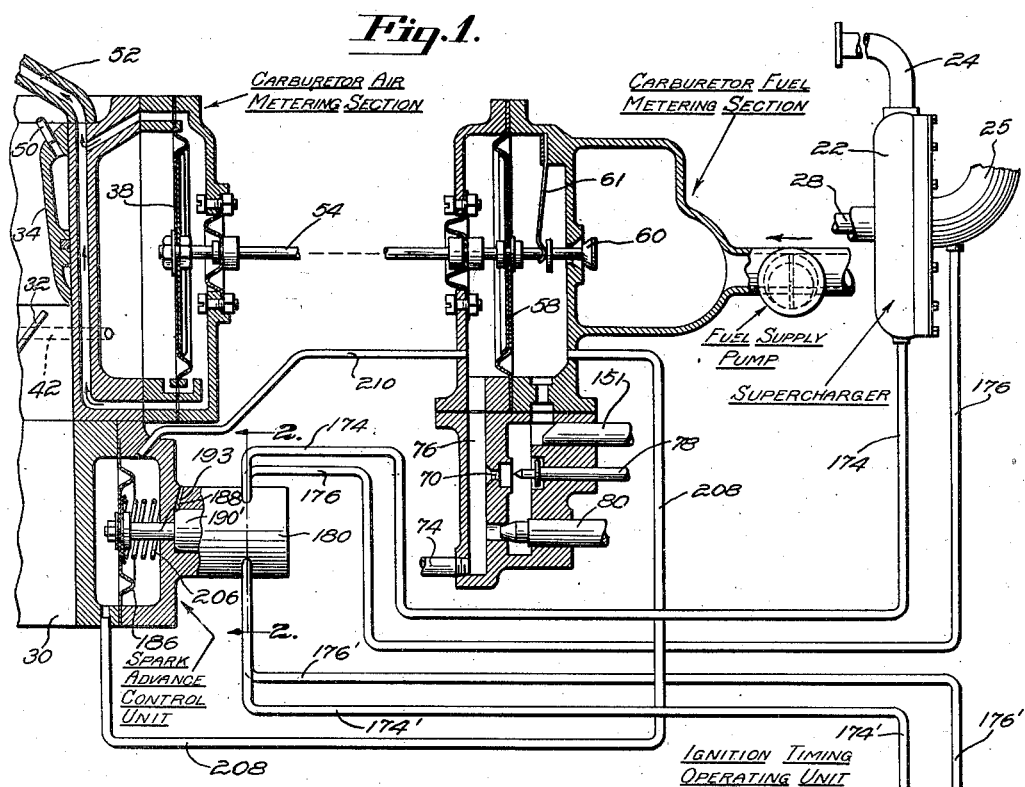
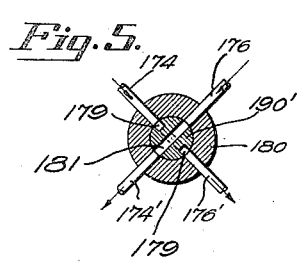
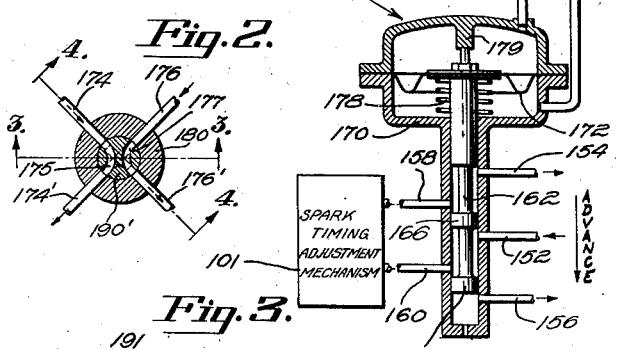
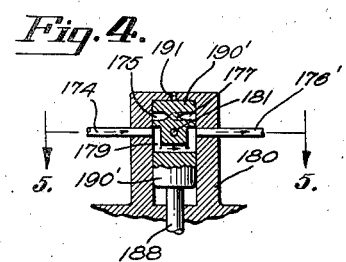
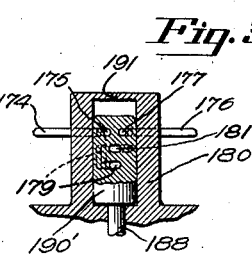
INVENTOR
*Perry W. Pratt*
BY
*H. Hume Mathews*
ATTORNEY.

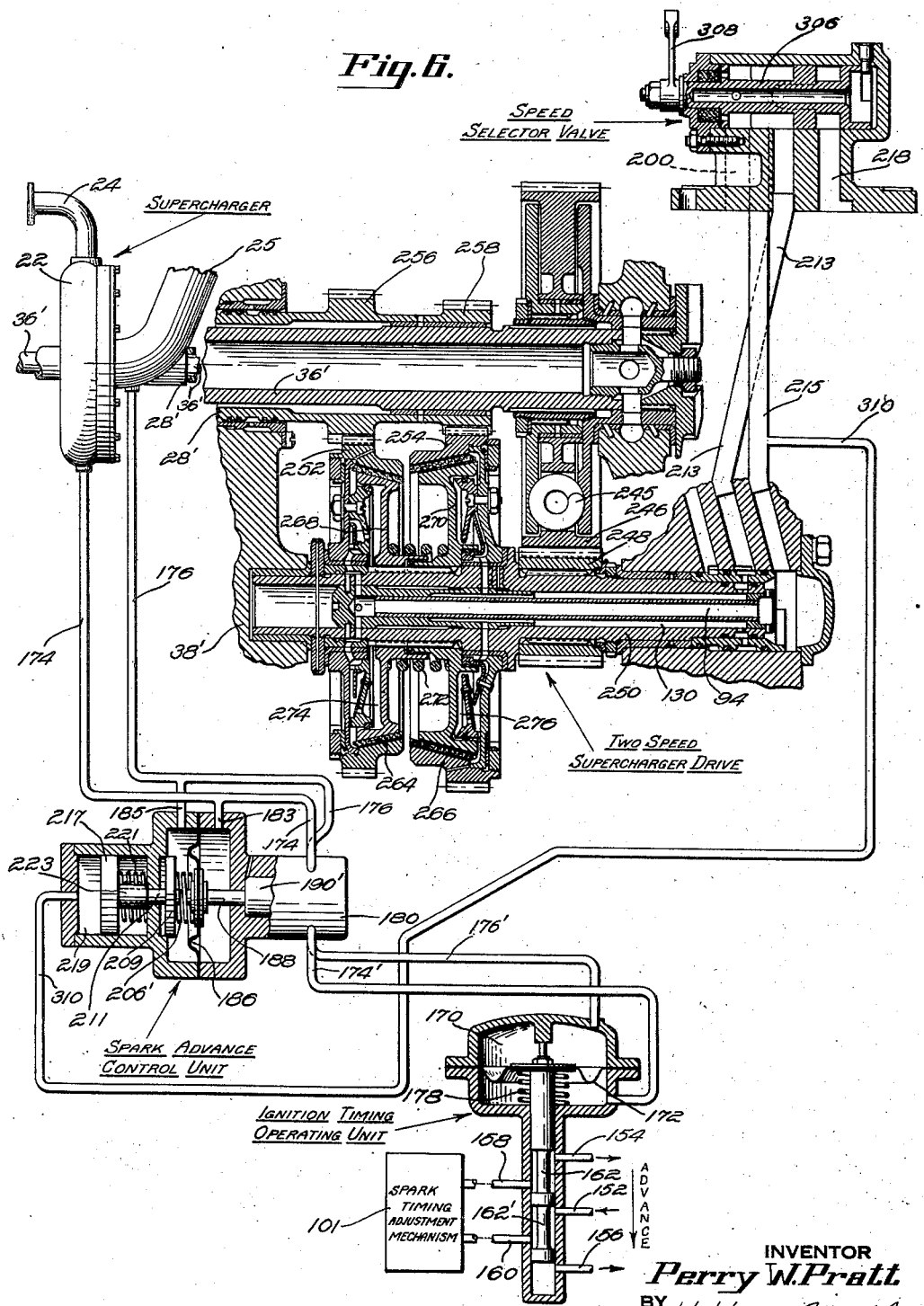

Patented Aug. 24, 1948

2,448,003

UNITED STATES PATENT OFFICE 2,448,003

IGNITION CONTROL

Perry W. Pratt, Manchester, Conn., assignor to United Aircraft Corporation, East Hartford, Conn., a corporation of Delaware Application October 27, 1945, Serial No. 625,078

8 Claims. (Cl. 123—117)

This invention relates to ignition timing systems, particularly for internal combustion aircraft engines.

An object of this invention is to provide a simplification and improvement in engine ignition timing systems, particularly adapted for use with ignition timing systems of the type disclosed and claimed in Jarvis U. S. Patent No. 2,380,967.

Another object is to provide means for shifting an aircraft engine ignition timing device to both advanced and retarded spark positions by supercharger pressure rise.

A further object is to provide an improvement in the construction and arrangement of a spark advance control unit.

Other objects and advantages will be apparent from the specification and claims, and from the accompanying drawing which illustrates what is now considered to be a preferred embodiment of the invention.

Referring to the drawings, Fig. 1 is a diagrammatic view showing the actuating and control portions of an ignition timing system constructed according to the teaching of the present invention, and particularly adapted for use with a radial aircraft engine having an engine driven supercharger.

Fig. 2 is a sectional view of the spark advance control unit taken along the line 2—2 of Fig. 1.

Fig. 3 is a sectional view along the line 3—3 of Fig. 2.

Fig. 4 is a sectional view along the line 4—4 of Fig. 2.

Fig. 5 is a sectional view along the line 5—5 of Fig. 4.

Fig. 6 is a diagrammatic view showing a modification of the timing system of Fig. 1 which is particularly adapted for use with a radial aircraft engine having a supercharger driven by the engine through a two-speed transmission and incorporating means for compensating the operation of the control unit for changes in the speed ratio of the transmission.

Two preferred embodiments of this invention are described below. The first (Fig. 1) utilizes to some extent the teaching of Jarvis U. S. Patent No. 2,380,967. The second (Fig. 6) utilizes to some extent the teachings of Hasbrouck U. S. application Serial No. 469,931, now Patent No. 2,390,146, filed December 23, 1942, Parkins et al. U. S. application Serial No. 479,600, now Patent No. 2,390,166, filed March 18, 1943, and Waring U. S. application Serial No. 601,437, filed June 25, 1945, all assigned to applicant's assignee.

Description of Fig. 1

This figure shows a portion of the fuel and air system for a radial aircraft engine including a carburetor air metering section, a carburetor fuel metering section, a fuel supply pump and a supercharger. Reference is made to Jarvis U. S. Patent No. 2,380,967 for a detailed description of these parts. Briefly, they include an air head diaphragm 38 which is subjected to an air pressure difference that is a measure of the rate of flow of engine intake air, which flows from the atmosphere through the metering passage of the carburetor (a portion of which is shown at 30) and then to the engine cylinders (not shown) through the supercharger inlet pipe 25, the supercharger or blower 22, and the induction pipes 24. The supercharger is preferably of a conventional type, having a centrifugal impeller (not shown) mounted on an engine driven shaft 28. The rate of airflow is controlled in a conventional way by throttle 32, located in the intake passage upstream of the inlet to blower 22. A pair of venturis, one of which is partially shown at 34, and impact tubes 50 establish a pressure difference that may be modified by an altitude compensator (not shown) as described in Jarvis U. S. Patent No. 2,380,967, so that the pressure differential applied across air diaphragm 38 by scoop passage 42 and throat passage 52 is an accurate measure of the rate of flow by weight of engine intake air at all aircraft altitudes.

The force exerted on diaphragm 38 by the air head is transmitted to fuel control valve 60 by a stem 54. Fuel is pumped to the engine cylinders by the fuel supply pump in an amount regulated in predetermined relation to intake airflow by valve 60. If desired, this valve may be biased to open position by a weak spring 61 and it is also urged to open position by the air head force applied by diaphragm 38 to stem 54. Fuel passing through valve 60 flows through the main metering jet or flow restriction 70 of the fuel metering section and then passes to the engine through the fuel conduit 74. Additional fuel may be admitted to the engine at higher engine outputs, in a known manner, by economizer valve 80. The fuel flow through jet 70 is preferably controlled to provide rich or lean fuel-air ratios, or mixture settings, by mixture control valve 78. Under idling conditions the fuel flow may be regulated by the idle valve 151.

Fuel flowing through jet 70 (and at higher engine powers through economizer valve 80) establishes a fuel head differential on opposite sides of a fuel diaphragm 58 attached to fuel valve stem 54. This fuel head is a measure of the rate of fuel flow by weight and exerts a resultant force on diaphragm 58 and stem 54 which urges valve 60 to closed position. Consequently diaphragms 38 and 58 cooperate to position valve 60 so as to proportion the fuel flow and airflow in predetermined ratio, which ratio may be controlled by the valves 78 and 80. It will be further seen that the fuel head across diaphragm 58 between the unmetered fuel chamber on the upstream side of jet 70 and the metered fuel chamber on the downstream side of jet 70 will be maintained proportional to the air head or pressure differential across air diaphragm 38. Therefore the fuel metering differential, as well as the air differential, is an accurate measure of intake airflow and engine power and may be utilized for actuating the spark advance control unit in accordance with variations in engine power.

The ignition timing operating unit and timing adjustment mechanism are also described in detail in Jarvis U. S. Patent No. 2,380,967. The operating unit includes a chamber 170 which contains a diaphragm 172 urged in an upward direction by a calibrated compression spring 178. If desired, a stop 179 may be provided to limit the upward movement of the diaphragm. The diaphragm is connected to a valve 162 having lands 166, 168 thereon which control the application of fluid under pressure (such as engine lubricating oil) from the pressure oil supply pipe 152 to the pipes 158, 160 of a timing adjustment mechanism 101, which may consist of an adjustable magneto gear train and a servo-motor for adjusting the same, as disclosed in the Jarvis patent. In the position of the operating unit shown in Fig. 1, pressure oil is admitted from line 152 to line 160 and the line 158 is connected to the drain 154. The timing adjustment mechanism 101 is moved to or maintained in the spark retarded position (which may be for some installations about 20° B. T. C.), by the fluid pressure in line 160. When sufficient pressure head is exerted across diaphragm 172 to move the valve 162 to its lowermost position, in which the land 168 abuts the bottom of casing 170, then the line 152 is connected with the line 158 and the line 160 is connected to drain 156. In this position of the operating unit the timing adjustment mechanism 101 is moved to or maintained in the spark advanced position (which may be for some installations about 35° B. T. C.), by the fluid pressure in line 158.

Conduits 174, 176 of the supercharger are reversibly connected to conduits 174', 176' of the operating unit through a valve 190', which is reciprocated in the cylinder 180 of the spark advance control unit by the diaphragm 186. This diaphragm is subjected to fuel metering pressure differential by a line 208 connected to the unmetered fuel chamber and a line 210 connected to the metered fuel chamber. Drains 191 (Fig. 3) and 193 (Fig. 1) are provided at each end of cylinder 180 so as to enable valve piston 190' to be moved to the extreme left hand and right hand positions determined by shoulders or walls at each end of the cylinder. The valve piston is urged to its left hand position by a calibrated compression spring 206 and is rapidly moved to its extreme right hand position when the fuel head across diaphragm 186 increases beyond a predetermined value which is sufficiently large to overcome the force of spring 206.

When valve piston 190' is in its left hand position as shown in Fig. 1 conduits 174 and 174' are interconnected by the valve channel 175 (Fig. 2) and the conduits 176, 176' are interconnected by the valve channel 177. In this position of the control unit (at low fuel metering heads and low engine power) the pressure rise directly across the supercharger is exerted on diaphragm 172 in a direction tending to urge stem 162 of the operating unit downwardly, to the spark advanced position. However, under engine idling conditions or at lower engine powers the supercharger pressure rise is quite low, because the supercharger impeller will be rotating at relatively low speeds. Spring 178 is made strong enough to overcome this relatively low supercharger pressure rise and consequently the stem 162 of the operating unit will be held in its upper, spark retarded position by the spring 178 for starting and idling conditions.

The pressure rise across the supercharger is a fairly accurate indication of engine power, and further provides a fluid pressure differential which is of sufficient size to provide an actuating pressure for the ignition timing operating unit. Therefore, when throttle 32 is opened to increase engine power the pressure rise across the supercharger also increases, because of the increased impeller speed, and when the engine reaches or approaches the cruising or intermediate power range the pressure head across diaphragm 172 becomes large enough to overcome the force of spring 178 and forces stem 162 downwardly to its lowermost position, thereby connecting conduit 160 to drain and connecting conduit 158 to the pressure source 152, thereby actuating the shifting mechanism 101 so as to change the ignition timing to the spark advanced position.

During this process, valve piston 190' remains in its left hand position because the spring 206 is made strong enough to overcome the force exerted on diaphragm 186 by the fuel metering differential during idling and cruising or intermediate powers.

With further increases in engine power, supercharger pressure rise also further increases. Diaphragm 172 and valve 162 will therefore be maintained in the spark advanced position until engine power approaches or reaches the full or higher power range, or until the fuel metering head across diaphragm 186 increases beyond a predetermined higher value sufficient to overcome the force of spring 206. When this occurs stem 188 and valve piston 190' are shifted by the resultant force on diaphragm 186 to the extreme right hand position shown in Figs. 4 and 5. In this right hand position the connections between conduits 174, 176 and 174', 176' are reversed, with valve channel 179 (Fig. 4) connecting conduit 174 to conduit 176' and valve channel 181 connecting conduit 176 to conduit 174'; just the opposite of the connections described above for the left hand position of the valve piston.

When the valve piston is in the right hand position as shown in Figs. 4 and 5 the supercharger outlet pressure will be applied by conduits 174, 176' to the lower side of the diaphragm 172 and the supercharger inlet pressure will be applied by conduits 176, 174' to the upper side of the diaphragm 172 and consequently the supercharger pressure rise will be exerted on the diaphragm in a direction tending to move the valve 162 upwardly against the stop 179, to the spark retarded position. Consequently when the fuel metering head becomes large enough to overcome the force of spring 206 (the spring is preferably designed so that this occurs at the upper end of the cruising power range), valve 162 of the operating unit will be rapidly and positively moved upwardly by supercharger pressure rise to the spark retarded position of Fig. 1, in which pressure oil is admitted from line 152 to the line 160 to actuate the shifting mechanism 101 so as to change to the spark retarded position.

Operation of Fig. 1

Under engine starting and idling conditions the control unit is maintained in the left hand position by spring 206 and the lines 174, 176 are connected to lines 174', 176', respectively, thereby subjecting the top of diaphragm 172 to supercharger outlet pressure and the bottom of diaphragm 172 to supercharger inlet pressure. However, spring 178 holds valve 162 in the spark retarded position. When the engine power is increased to the cruising range the pressure differential between the supercharger outlet and inlet becomes large enough (such as 5" Hg for some installations) to move valve 162 downwardly, thereby causing mechanism 101 to shift the spark to the advanced position.

The spark is maintained in advanced position through the cruising or intermediate power range, until at the beginning of the higher power range (for instance under take-off and climbing conditions) the fuel head across diaphragm 186 exceeds a predetermined value (such as 6" of water) and forces the control unit to the right hand position thereby connecting conduit 174 to the conduit 176' and connecting conduit 176 to conduit 174'. This reverses the pressure difference across diaphragm 172, subjecting its lower side to supercharger outlet pressure and its upper side to supercharger inlet pressure. This reversal of the fluid pressure force applied by the supercharger to the diaphragm 172 positively shifts the operating valve 162 upwardly to the position in which the mechanism 101 shifts the spark to the retarded position. Spring 178 aids the upward movement of valve 162.

With this arrangement the supercharger pressure rise moves the ignition timing operating unit to both retarded and advanced positions. Yet the point or time at which the timing change is made is controlled very accurately according to variations in fuel head by the spark advance control unit.

Description of Fig. 6

In the embodiment of this figure the supercharger is driven by a gear transmission having two speed ratios which may be selectively engaged by friction clutches hydraulically operated by means of a selector valve.

This transmission is described in Waring U. S. application Serial No. 601,437. It includes a lay or clutch shaft 250 to which the pinion 248 and the clutch elements 268, 270 are splined and on which the low and high ratio gear members 252 and 254 are rotatively supported. Gear 252 has a clutch face or friction band 264 thereon with which the clutch element 268 may be engaged, by axial movement of the element along the splines on the shaft 250, to form a relatively low speed ratio drive for the impeller shaft 28'. Gear 254 is provided with a similar band 266 which is engaged by axial movement of element 270 to form a high speed ratio drive.

Power is transmitted from the engine crankshaft to the supercharger impeller through engine driven tail shaft 36', the gear 246 (which incorporates a spring drive unit 245), pinion 248, shaft 250, either low speed gear 252 or high speed gear 254 (depending upon which of the clutch elements 268, 270 is engaged) and impeller shaft 28'.

Each clutch is urged toward disengaged position by a spring 272 which biases the clutch elements 268, 270 away from the clutch bands 264, 266. To engage one or the other of the clutches fluid under pressure (such as engine lubricating oil) is admitted to one or the other of the cylinders or chambers 274, 276, respectively associated with each clutch. The parts are so arranged that fluid admitted to either chamber acts on the corresponding clutch element to move it axially, like a piston, to compress the spring 272 and to engage the clutch element with the surrounding gear.

Admission of fluid to the chambers 274, 276 is controlled by valve 306, shown in the low speed ratio position in Fig. 6 with the low gear clutch 268, 252 engaged. When the valve handle 308 and valve 306 are in the position shown in this figure, fluid is admitted from the pressure source 218 to the pipe 215. From there it passes through the inner bore 94 to the low clutch chamber 274, where it forces element 268 into driving contact with band 264 and engages the transmission in low gear ratio, to drive the impeller at a low speed relative to engine speed. When pressure fluid is being admitted to pipe 215 the high ratio clutch chamber 276 is connected to the drain 200, by bore 130 and pipe 213. Consequently spring 272 will hold the high clutch element 270 disengaged when the low clutch element 268 is engaged.

Rotation of valve 306 by handle 308 from the low ratio position of Fig. 6 to a high ratio position (not shown) connects the pressure source 218 to the high clutch line 213 and connects the low clutch line 215 to the drain 200. Thus, in the high ratio position of valve 306 pressure fluid is admitted to chamber 276 to engage the transmission in high gear ratio and the low clutch chamber 274 is connected to drain, permitting spring 272 to disengage the low clutch.

When the valve 306 is in the low speed ratio position, and the supercharger is being driven at a relatively low speed relative to the engine, the low clutch lines 94 and 215, and consequently the branch line 310 connected thereto, contain fluid under pressure, the high clutch lines 130 and 213 are connected to drain 200. In the high speed ratio position of valve 306 the lines 94 and 215, and consequently branch line 310, are connected to drain 200, and there will be little or no pressure therein; the high clutch lines 130, 213 are connected to source 218 and consequently contain fluid under pressure.

The ignition timing operating unit in Fig. 6 is exactly the same as described above in connection with Fig. 1. The valve piston 190' and the cylinder 180 of the spark advance control unit in Fig. 6 are also exactly the same as the corresponding parts of the control unit described above in connection with Fig. 1, but the actuating means for the valve piston 190' has been modified according to the embodiment of Fig. 6 in order to utilize supercharger pressure rise as a control means as well as an actuating means for the operating unit and so as to enable the control unit, if desired, to be compensated for changes in the speed ratio of the supercharger drive, resulting from actuation of the selector valve handle 308.

In Fig. 6 diaphragm 186 of the control unit is interposed between two fluid tight chambers respectively connected to supercharger rim (or outlet) by conduits 174, 183 and supercharger throat (or inlet) by conduits 176, 185; conduits 174, 176 are also connected to the cylinder 180 in the manner described in connection with Fig. 1.

Diaphragm 186 is biased to the right, urging valve piston 190' to its right hand position, by the spring 206' and this spring is supported at its left hand end by a movable abutment 209, the position of which determines the pre-load or the datum force of the spring 206'.

Abutment 209 is connected to a piston rod 211 having on its left hand end a piston 217 which reciprocates in a cylinder 210. A spring 221 urges piston 217 and abutment 209 to the left. Rod 211 is separate from the stem 188 of the valve piston 190' and consequently the valve piston operates independently of the diaphragm spring loading piston 217; the piston 217 and abutment 209 serve merely to change the force exerted by spring 206' on the diaphragm 186 as the abutment 209 is moved to the right or to the left in response to changes in the fluid pressure admitted to the cylinder 219 through the branch conduit 310. In the embodiment of the invention selected for illustration in Fig. 6, this branch conduit is connected to the conduit 215 of the supercharger drive so that when the transmission is engaged in the low speed ratio fluid pressure from line 215 is admitted by conduit 310 to the cylinder 219 forcing piston 217 and abutment 209 to the right (to a position determined by stop 223) against the force of spring 211. This causes the abutment to compress diaphragm spring 206' and increases the spring force urging valve piston 190' to its right hand position. However, it is to be understood that it is within the scope of the invention to connect branch conduit 310 to conduit 213 instead of conduit 215, which may be preferable in some installations where it is desired to increase the loading on spring 206' when the transmission is in the high speed ratio, rather than the low speed ratio.

In Fig. 6, valve piston 190' will be maintained in its right hand position by the spring 206' when the pressure difference between conduits 174, 176 is below a predetermined value. In this position conduit 174 is connected to conduit 176' and conduit 176 is connected to conduit 174', just the same as in Fig. 1. However, it will be noted that the connections between conduits 174' and 176' and the chamber 170 of the operating unit are reversed in Fig. 6 (as compared with Fig. 1), consequently in Fig. 6 the diaphragm 172 of the operating unit will be urged downwardly to the spark advanced position by the pressure difference between the rim and throat lines 174, 176 when the valve piston 190' is in its right hand position.

When the valve piston 190' is in the left hand position conduit 174 is connected to conduit 174' and conduit 176 is connected to conduit 176' and the pressure difference between rim and throat lines 174, 176 will be exerted across diaphragm 172 in a direction urging the operating diaphragm and valve 162 upwardly to the spark retarded position.

*Operation of Fig. 6*

Under idling engine power conditions, or for starting, spring 206' of the control unit holds the valve piston 190' in its right hand position, and supercharger rim or outlet pressure is admitted to the chamber on the upper side of operating diaphragm 172 and supercharger throat or inlet pressure is admitted to the chamber on the lower side of this diaphragm. However, under these conditions the supercharger pressure rise is not large enough to overcome the force of spring 178, and the spring holds the diaphragm 172 and valve 162 in their upper or spark retarded position. As the engine power is increased supercharger pressure rise also increases and when engine power exceeds a predetermined approximate value (preferably just below or in the lower portion of the cruising power range) the supercharger pressure rise becomes sufficiently large to compress spring 178 and move valve 162 downwardly, thus advancing the ignition timing. Further increases in engine power and supercharger pressure rise tend to maintain the spark advanced, until a large enough pressure rise is created by the supercharger between lines 174, 176 to move diaphragm 186 of the control unit to the left against the force of spring 206', thereby shifting valve piston 190' to its extreme left hand position. When this shift occurs the connections between lines 174, 176' and lines 176, 174' are reversed so that supercharger rim pressure is applied on the bottom of diaphragm 172 and supercharger throat pressure is applied on the top of the diaphragm. The resultant change in the direction of the fluid pressure force across diaphragm 172, aided by the force of spring 178, shifts valve 162 to its upper position and results in changing the ignition timing to retarded position.

This sequence of events occurs regardless of the position of the speed selector valve 206 and piston 217 and abutment 209. However, when the branch conduit 310 is connected to low ratio line 215, as shown, and the speed selector valve and the supercharger drive are in the low gear ratio, in which clutch 268 is engaged, fluid pressure is admitted by conduit 310 to the cylinder 219 and the abutment 209 will be moved to or maintained in its right hand position in which the preload on the spring 206' is increased to a relatively high value. Under this condition a relatively large value of supercharger pressure rise will be required to move the valve piston 190' to the left. This same result may be produced when the transmission is in the high gear ratio (with clutch 270 engaged), by connecting branch conduit 310 to high ratio conduit 213, instead of low ratio conduit 215.

When branch conduit 310 is connected to conduit 215, as shown in Fig. 6, and when the speed selector valve and the supercharger drive are in the high gear ratio, lines 215 and 310 are connected to drain and the spring 221 will hold piston 217 and abutment 209 in the left hand position. Under these conditions spring 206 is preloaded to a relatively low value thus enabling diaphragm 186 to shift the valve piston 190' to the left at a relatively low value of supercharger pressure rise.

The tendency of the engine to detonate is increased by an increase in the temperature of the charging fluid, such as usually results from an increase in impeller speed; it is also increased by an advance in ignition timing. Therefore when the impeller is being driven in high gear ratio it may be desirable in some installations to retard the timing when supercharger pressure rise reaches a value which is lower than the rise at which the timing is shifted from advance to retard with low impeller speed ratio operation. The form of the invention shown in Fig. 6 automatically accomplishes this result to some degree, because a shift in transmission ratio from low to high speed results in an increase in the pressure rise across the supercharger, other factors remaining constant. In addition, the piston 217 may be actuated as described above by either high or low ratio clutch pressure so as to automatically provide additional compensation or adjustment of the control unit in accordance with a change in the speed of the impeller relative to the engine.

It is to be understood that the invention is not limited to the specific embodiment herein illustrated and described, but may be used in other ways without departure from its spirit as defined by the following claims.

I claim:

1. In an aircraft engine having a supercharger and an ignition system, a device for advancing and retarding the timing of said ignition system, means for subjecting said device to the pressure rise across said supercharger in a sense such as to advance said timing, and means for subjecting said device to the pressure rise across said supercharger in the opposite sense so as to retard said timing.

2. An ignition timing system for an engine having a supercharger, comprising, means for causing the pressure rise directly across said supercharger to advance the ignition timing of said engine upon an increase in said pressure rise to a first predetermined value, and means for causing said pressure rise to retard the ignition timing of said engine upon a further increase in said pressure rise to a second predetermined value.

3. A system according to claim 2, including a multi-speed gear transmission for driving said supercharger by said engine, and means for automatically changing said second predetermined value at which said timing is retarded in accordance with changes in the speed ratio of said transmission.

4. In an ignition timing system for an engine having a supercharger and a diaphragm for changing the ignition timing of said engine, a first pair of conduits connected across said supercharger, a second pair of conduits connected across said diaphragm, and a fluid pressure responsive valve for connecting said second pair of conduits with said first pair of conduits in either of two reversed positions.

5. Apparatus according to claim 4, in which said valve is responsive to a fluid pressure which varies as a function of the engine intake airflow.

6. Apparatus according to claim 4, in which said valve is responsive to the pressure rise across said supercharger.

7. In a control apparatus for an engine having a supercharger and a device for changing an operating characteristic of said engine, means including a valve for applying the pressure rise across supercharger to said device in either of two opposite senses, said valve being movable to a first position in which said pressure rise is applied to said device in a sense such as to vary said operating characteristic in a given direction and being movable to a second position in which said pressure rise is applied to said device in the opposite sense so as to vary said operating characteristic in the opposite direction, and means responsive to changes in the rate of flow of engine intake air for moving said valve between said first and second positions.

8. In a control apparatus for an engine having a supercharger and a device for changing an operating characteristic of said engine, means including a valve for applying the pressure rise across said supercharger to said device in either of two opposite senses, said valve being movable to a first position in which said pressure rise is applied to said device in a sense such as to vary said operating characteristic in a given direction and being movable to a second position in which said pressure rise is applied to said device in the opposite sense so as to vary said operating characteristic in the opposite direction, and means responsive to changes in the pressure rise across said supercharger for moving said valve between said first and second positions.

PERRY W. PRATT.

REFERENCES CITED

The following references are of record in the file of this patent:

UNITED STATES PATENTS

| Number | Name | Date |
|---|---|---|
| 2,380,967 | Jarvis | Aug. 7, 1945 |

Certificate of Correction

Patent No. 2,448,003.

August 24, 1948.

PERRY W. PRATT

It is hereby certified that error appears in the printed specification of the above numbered patent requiring correction as follows: Column 10, line 11, claim 7, before the word "supercharger" insert *said*; and that the said Letters Patent should be read with this correction therein that the same may conform to the record of the case in the Patent Office.

Signed and sealed this 9th day of November, A. D. 1948.

[SEAL]

THOMAS F. MURPHY,
*Assistant Commissioner of Patents.*